(12) United States Patent
Engels et al.

(10) Patent No.: US 8,256,647 B2
(45) Date of Patent: Sep. 4, 2012

(54) VALVE ASSEMBLY FOR DISPENSING FLOWABLE MATERIALS

(75) Inventors: Marcel Engels, Voorhout (NL); Marcus Johannes Voskuil, Oegstgeest (NL); Goran Aleksijovski, Noordwijk (NL); Rob van Leeuwen, Sassenheim (NL)

(73) Assignee: Fluid Management Operations LLC, Wheeling, IL (US)

( * ) Notice: Subject to any disclaimer, the term of this patent is extended or adjusted under 35 U.S.C. 154(b) by 813 days.

(21) Appl. No.: 12/371,107

(22) Filed: Feb. 13, 2009

(65) Prior Publication Data
US 2010/0206902 A1 Aug. 19, 2010

(51) Int. Cl.
*B67D 7/70* (2010.01)

(52) U.S. Cl. ........ 222/137; 222/132; 222/134; 222/330; 222/333; 222/456; 222/506; 239/446; 141/104; 141/305

(58) Field of Classification Search ............ 222/74–75, 222/135–142, 142.2, 142.9, 330, 333, 478–489, 222/145.4, 285–288, 132, 134, 506, 526–529, 222/531–532, 536–537, 544–545, 565; 239/289, 239/446; 141/99–107, 234–236, 305; 426/289, 426/292
See application file for complete search history.

(56) References Cited

U.S. PATENT DOCUMENTS

| | | | | |
|---|---|---|---|---|
| 2,234,749 A * | 3/1941 | Doucette | ............ | 222/142.6 |
| 2,692,705 A * | 10/1954 | Marihart | ............ | 222/313 |
| 4,143,688 A * | 3/1979 | Gill et al. | ............ | 141/104 |
| 5,171,367 A * | 12/1992 | Fitch, Jr. | ............ | 118/25 |
| 5,188,262 A * | 2/1993 | Fielding | ............ | 222/201 |
| 5,427,283 A * | 6/1995 | Whittaker et al. | ............ | 222/414 |
| 5,493,852 A * | 2/1996 | Stewart | ............ | 56/16.8 |
| 5,617,974 A * | 4/1997 | Sawyer, Jr. | ............ | 222/107 |
| 7,311,223 B2 * | 12/2007 | Post | ............ | 222/1 |
| 7,632,529 B2 * | 12/2009 | Lang | ............ | 426/249 |
| 2007/0012378 A1 * | 1/2007 | Miller et al. | ............ | 141/104 |
| 2008/0198688 A1 | 8/2008 | Peng | | |

FOREIGN PATENT DOCUMENTS

| | | |
|---|---|---|
| DE | 296 02 684 U1 | 6/1996 |
| EP | 0 800 858 A | 10/1997 |
| WO | WO 2005/107933 A | 11/2005 |

* cited by examiner

*Primary Examiner* — Kevin P Shaver
*Assistant Examiner* — Andrew P Bainbridge
(74) *Attorney, Agent, or Firm* — Miller, Matthias & Hull LLP

(57) ABSTRACT

A valve assembly for dispensing a plurality of flowable materials, such as viscous fluids or powders, comprising a valve member having a plurality of inlets for the plurality of flowable materials and dispense outlets communicating with the inlets and a closure having one or more openings in a pattern that corresponds to the pattern of at least some of the outlets. The valve member and the closure are movable relative to each other between a closed position in which the outlets are closed and at least one dispensing position in which one or more openings in the closure are at least partially in register with the dispense outlets thus clearing the latter.

13 Claims, 3 Drawing Sheets

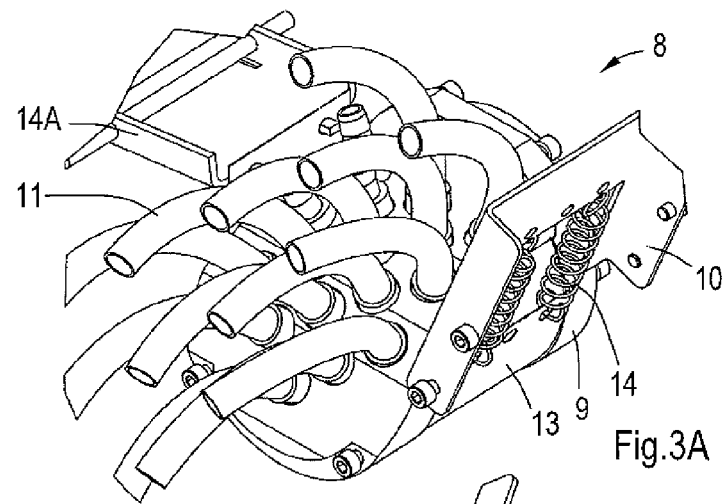
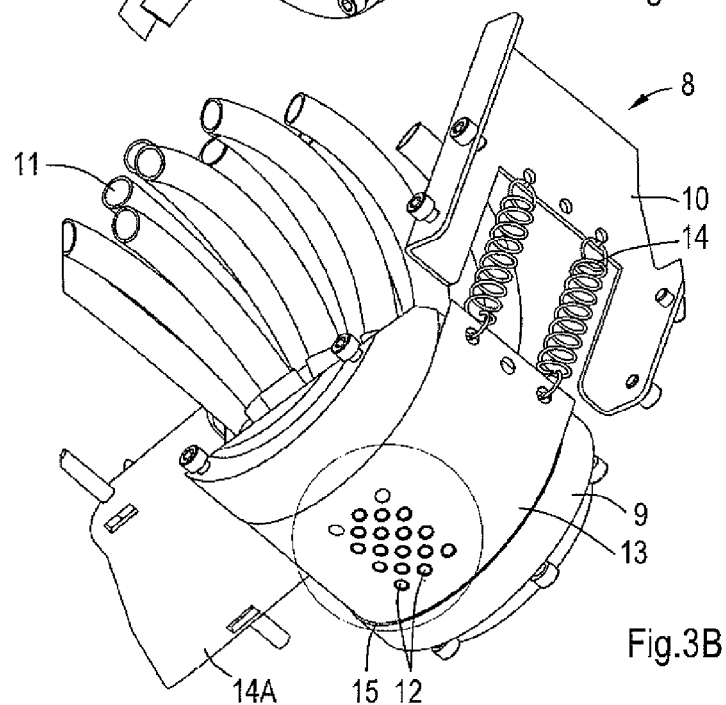
Fig.3A
Fig.3B
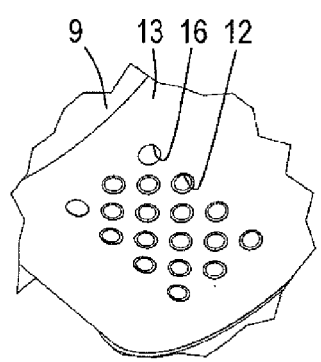
Fig.4A
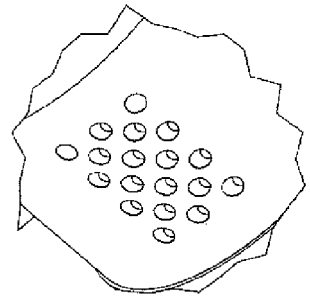
Fig.4B
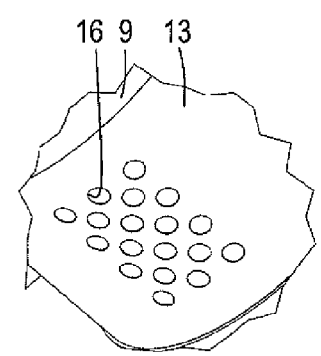
Fig.4C

VALVE ASSEMBLY FOR DISPENSING FLOWABLE MATERIALS

TECHNICAL FIELD

A valve assembly and an apparatus are disclosed for dispensing flowable materials, in particular viscous fluids and powders.

BACKGROUND OF THE DISCLOSURE

US 2005/205154 relates to a closure system for fluid dispensers. The disclosed system is a motorized, articulated system that, in a closed position, provides a cover or closure for a nozzle or nozzle manifold through which one or more fluids are dispensed. In the closed position, the closure element is disposed beneath the nozzle or nozzle manifold and collects any fluid drippings between dispensing operations and also preferably provides a sealing effect. To move the closure system to an open or to a dispense position, a motor is activated which moves the closure element downward before pivoting the closure element away from the nozzle or nozzle manifold.

US 2007/0012378 discloses an apparatus for dispensing a plurality of fluids according to one of a plurality of formulas stored in a controller. The controller is linked to a coordinating board which, in turn, is linked in series to a plurality of pump modules and a manifold module. Each pump module includes its own module board which controls the operation of two pumps associated with that module. The modules, which include the module board, two pumps and two reservoirs as well as motors for driving the pumps, are all mounted on a module frame which is detachably connected to the system so that the modules may be easily changed or replaced. Further, the manifold module may also be easily replaced. The manifold module also includes a motorized closure system.

As explained in US 2007/0012378, in multiple fluid dispensing applications, both precision and speed are important. Precision is important as many formulations require the addition of precise amounts of ingredients. This is true in e.g. the paint, cosmetic, food, chemical, and pharmaceutical industries as the addition of more or less of a key ingredient can result in a noticeable change in the color or product or the efficacy of a product. Speed is important as many products are prepared at a point-of-sale for a customer. For example, paint formulations, cosmetic formulations, hair dyes and various nutritional products are often being prepared in retail environments while the consumer waits.

Further, one way in which the precision of dispensing systems is compromised is "dripping". Specifically, a "leftover" drip may be hanging from a nozzle that was intended to be added to a previous formulation and, with a new container in place under the nozzle, the drop of liquid intended for a previous formulation may be erroneously added to a new formulation. Thus, the previous container may not receive the desired amount of the liquid ingredient and the next container may receive too much.

To solve the drip problem, various scraper and wiper designs have been proposed. However, these designs often require one or more different motors to operate the wiper element and are limited to use on dispensing systems where the nozzles are separated or not bundled together in a manifold. Use of a wiper or scraping function would not be practical in a multiple nozzle manifold design as the ingredients from the different nozzles will be mixed by the wiper or scraper which would then also contribute to the lack of precision of subsequently produced formulations.

Another problem associated with dispensing systems that make use of nozzles lies in the dispensing of relatively viscous liquids such as tints, colorants, base materials for cosmetic products, certain pharmaceutical ingredients or other fluid materials having relatively high viscosities. Specifically, the viscous fluids have a tendency to dry and cake onto the end of the nozzles, thereby requiring frequent cleaning in order for the nozzles to operate effectively. While some mechanical wiping or scrapping devices are available, these devices are not practical for multiple nozzle manifold systems and the scraper or wiper element must be manually cleaned anyway.

It is an object of the present invention to provide a reliable valve assembly for dispensing a plurality of flowable materials, which can be opened and closed more rapidly e.g. to prevent the materials in the outlets from drying and caking.

SUMMARY OF THE DISCLOSURE

A disclosed valve assembly for dispensing a plurality of flowable materials, such as viscous fluids and powders, includes
 a valve member having a plurality of inlets for the plurality of flowable materials and dispense outlets communicating with the inlets and
 a closure having one or more openings in a pattern that corresponds to the pattern of at least some of the outlets,
 wherein the valve member and the closure are movable relative to each other between a closed position in which the outlets are closed and at least one dispensing position in which one or more openings in the closure are at least partially in register with the dispense outlets thus clearing the latter.

In a refinement, the closure comprises a plurality of openings arranged to simultaneously clear respectively close a plurality of dispense outlets, e.g. by means of a single relative motion of the closure and the valve member.

In a refinement, the closure comprises at least one strip having one or more openings for clearing or closing a plurality of dispense outlets. In a refinement, at least the portion of the valve member comprising the outlets is curved and the strip is slidably tensioned about this portion.

Thus, the strip will adapt to the shape of the valve member and tolerances of the valve member are less critical. Further, the strip can be replaced relatively easily and, if the strip is relatively thin, e.g. less than 0.5 mm or less than 0.3 mm thick, the openings are less likely to cause caking and/or can be readily cleaned.

In a refinement, the outlets and/or the openings are shaped to facilitate drop release. Suitable shapes include oval, triangular and star-shaped.

A disclosed apparatus for dispensing flowable materials, comprising a plurality of containers for the flowable materials and a plurality of pumps, wherein the suctions lines of the pumps are connected to respective containers and the pressure lines are connected to dispense outlets, optionally via a valve assembly as described above. At least some of the pumps comprise a valve for selectively connecting the pump to the container or to the pressure line, at least some of the containers comprise a stirrer, and at least some sets of a container and pump comprise an electric motor coupled to both the stirrer and to the valve, such that both the stirrer and the valve can be operated by means of the same electric motor.

In a refinement, the electric motor is coupled to the valve by means of a one way coupling, which decouples the valve from the motor in a first direction. Thus, when the electric motor rotates in a first direction, e.g. clockwise, it drives the stirrer while is decoupled from the valve which remains stationary, whereas in the other direction, in this example counterclockwise, the electric motor drives both the stirrer and the valve and can be used to operate the valve.

In a refinement, the electric motor is coupled to the stirrer by means of a one way coupling, which decouples the stirrer from the motor in a second direction, opposite to the first direction.

A module is disclosed for use in an apparatus as described above, including a container in turn comprising a stirrer, a pump, e.g. a piston pump, connected with its suction line to the container and in turn comprising a valve for selectively connecting the pump to the container or to a pressure line or dispense opening, and an electric motor coupled to both the stirrer and the valve.

In a refinement, the electric motor is coupled to the valve by means of a one way coupling, which decouples the valve from the motor in a first direction as explained above.

Such modules are suitable for use in dispensers wherein the containers and pumps are stationary and the pumps are connected to a manifold or valve assembly as described above and for use in dispensers comprising a turntable and a single dispensing position. The modules enable relatively straightforward replacement and/or maintenance.

BRIEF DESCRIPTION OF THE DRAWINGS

The disclosed valve assembly, apparatus, and pump and will be further explained with reference to the accompanying drawings in which a presently preferred embodiment of the invention is shown schematically.

FIGS. 3A and 3B are perspective views of the valve assembly of the dispense head of FIG. 2;

FIGS. 4A, 4B, and 4C show three positions of the valve assembly of FIGS. 3A and 3B.

It is noted that the drawings are not necessarily to scale and that details, which are not necessary for understanding the present invention, may have been omitted. As a matter of course, the disclosure is not limited to the particular embodiments illustrated herein.

DETAILED DESCRIPTION

Figure 1:
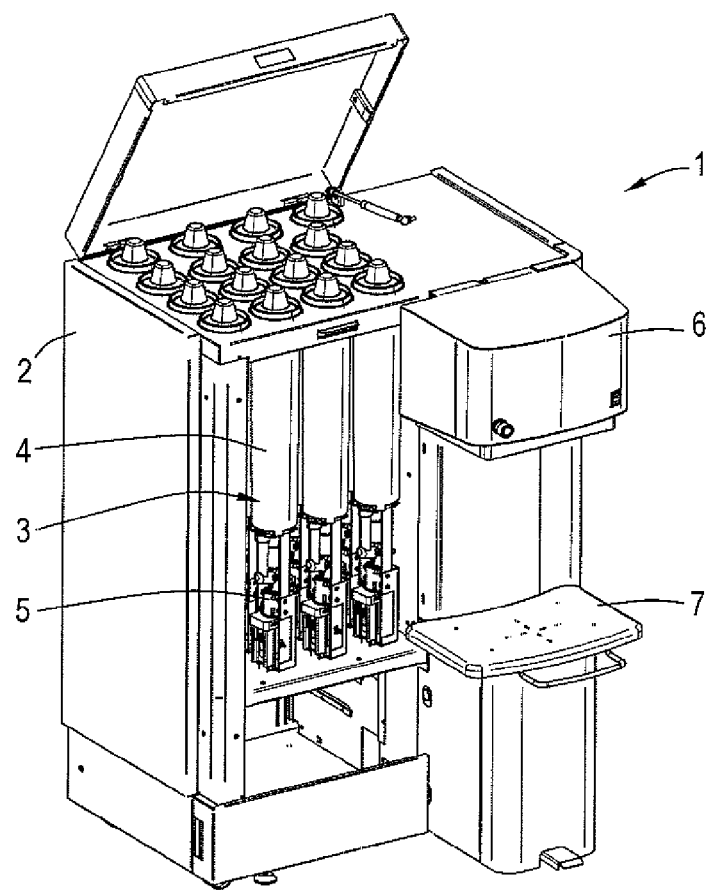
FIG. 1 is a perspective view of a disclosed apparatus for dispensing flowable materials.

FIG. 1 illustrates a preferred embodiment of an apparatus 1 for dispensing viscous fluids, such as colorants, base paints, and paint components for decorative purposes, such as masonry paints, and/or industrial purposes. Other examples of viscous fluids that can be dispensed with the apparatus 1 are shampoos, conditioners, foundations, hair dyes, food additives and/or components thereof.

Figure 2:
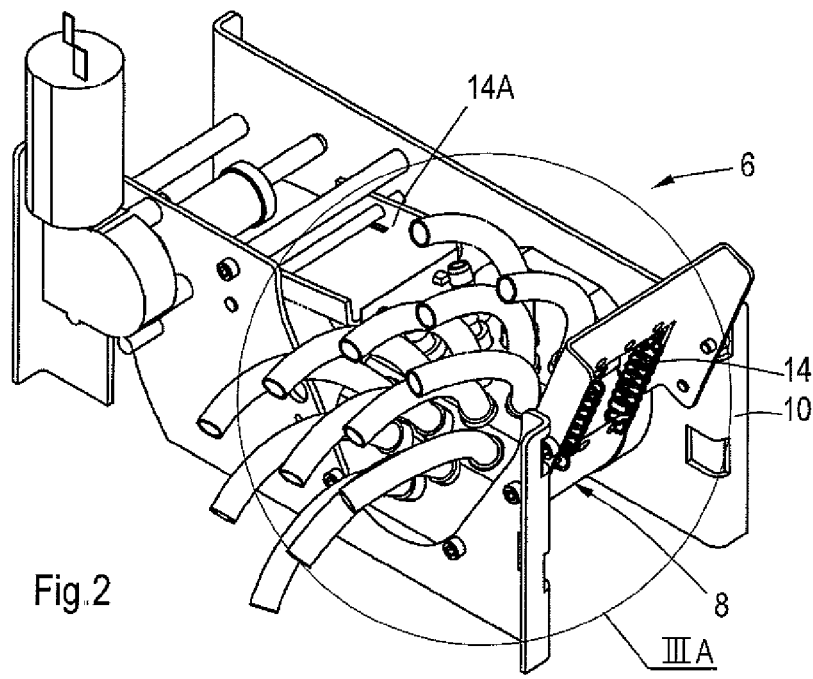
FIG. 2 is a perspective view of the dispensing head of the apparatus of FIG. 1.

This particular dispensing apparatus 1 includes a cabinet 2 accommodating a plurality of modules 3 of a container 4 and a pump 5, which modules 3 will be discussed in more detail below. The apparatus 1 further comprises a dispense head 6, shown in FIG. 2, a support 7 for a container located below the dispense head 6 and optionally provided with a weighing device, and electronic equipment (not shown) for driving the components of the apparatus 1. The dispense head 6 in turn comprises a valve assembly 8 for dispensing a plurality of flowable materials.

The valve assembly 8 is shown in more detail in FIGS. 3A to 4C and comprises a stationary valve member 9, fixed to e.g. a wall or frame 10 of the dispense head 6 and having a plurality of inlets for the plurality of flowable materials, which inlets are connected, via e.g. flexible tubes 11, to the pumps 5. The valve member 9 further comprises dispense outlets 12 communicating with the inlets and arranged in a pattern, e.g. arranged in staggered rows, on a curved and downward facing portion of the valve member 9.

A flexible strip 13, made of e.g. metal, plastic, or a fiber-reinforced composite, optionally coated with an anti-adhesive layer and/or having a thickness of less than 0.5 mm, e.g. 0.2 mm, is slidably tensioned about this portion by means of one or more springs 14 on one end and a lever 14A on the other end, and kept in place by guides 15, e.g. raised portions, defined in the valve member 9 on either side of the strip 13. The strip 13 comprises a plurality of openings 16 that have a diameter that can be slightly larger than the diameter of the outlets 12 and that correspond in shape, number, and pattern to the shape, number, and pattern of the outlets 12. The distance between the outlets 12 in the axial and tangential directions of the valve member 9, which coincide with, respectively, the lateral and longitudinal directions of the strip 13, is larger than the diameter of the openings 16 in the strip 13.

Thus, as shown in FIGS. 4A to 4C, all outlets can be simultaneously cleared (FIG. 4A) respectively closed (FIG. 4C) by moving the strip (FIG. 4B), in this example by means of the lever 14A, over a distance that is slightly larger than the diameter of the openings in the strip.

In a refinement, the valve member comprises features to compensate for wear, such as protruding rims surrounding the outlets, and/or for micro leakage, such as grooves or recesses for collecting material that has leaked from the outlets.

Instead of or in addition to a spring, the strip can be sealingly drawn to the valve member by means of one or more magnets. Magnets can also be employed to open and close the valve assembly.

In another example, the valve assembly comprises two or more strips for independently clearing and closing two or more dispense outlets or groups of dispense outlets. If, for instance two groups of containers are connected to the valve member, one group containing water-based components and the other group containing solvent-based components, dispensing from one of the groups of containers can be controlled with one strips and dispensing the other group can be controlled with the other strip.

In a further example, the valve member or the at least one strip comprises two or more outlets or openings or groups of outlets or openings, respectively, separated in the direction of relative movement. If the valve member comprises two or more outlets or groups of outlets and the strip comprises a single opening or group of openings, the outlets or groups of outlets can be opened and closed serially by the strip, e.g. to dispense from different groups of container similar to the embodiment with two or more strips described above. If the strip comprises two or more outlets or groups of outlets and the valve members comprises a single opening or group of openings, the outlets or groups of outlets can be opened by different types of openings, e.g. smaller and larger openings dependent on the amounts to be dispensed or openings having different shapes.

In yet further example, the valve assembly comprises a housing fixed to the dispense head of the apparatus and comprising a plurality of openings and a valve member, such as a cylinder or ball, rotatably mounted inside the housing, with the outlet extending in an at least substantially radial direction and the inlets and connected tubes extending parallel to the axis of rotation of the valve member and/or in an at least substantially radial direction upstream from the outlets.

Figure 5A:
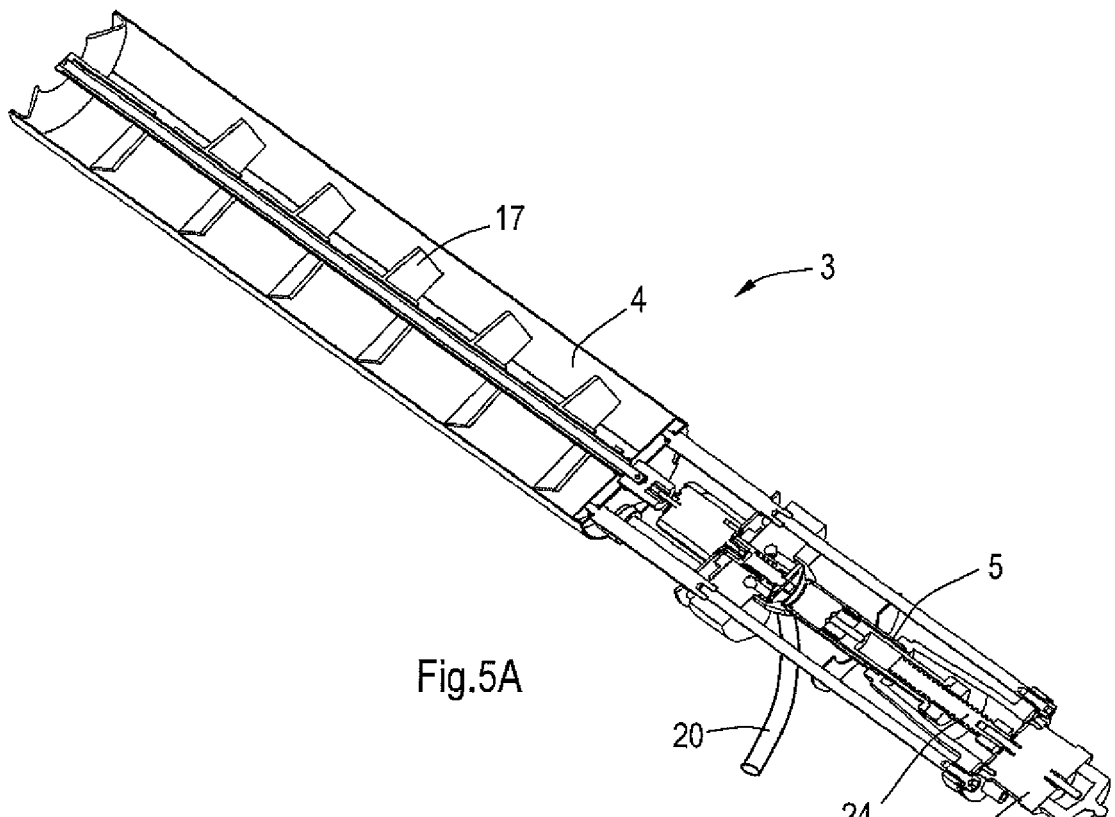
FIGS. 5A and 5B show a module comprising a container, stirrer, and pump as used in the apparatus of FIG. 1.
Figure 5B:
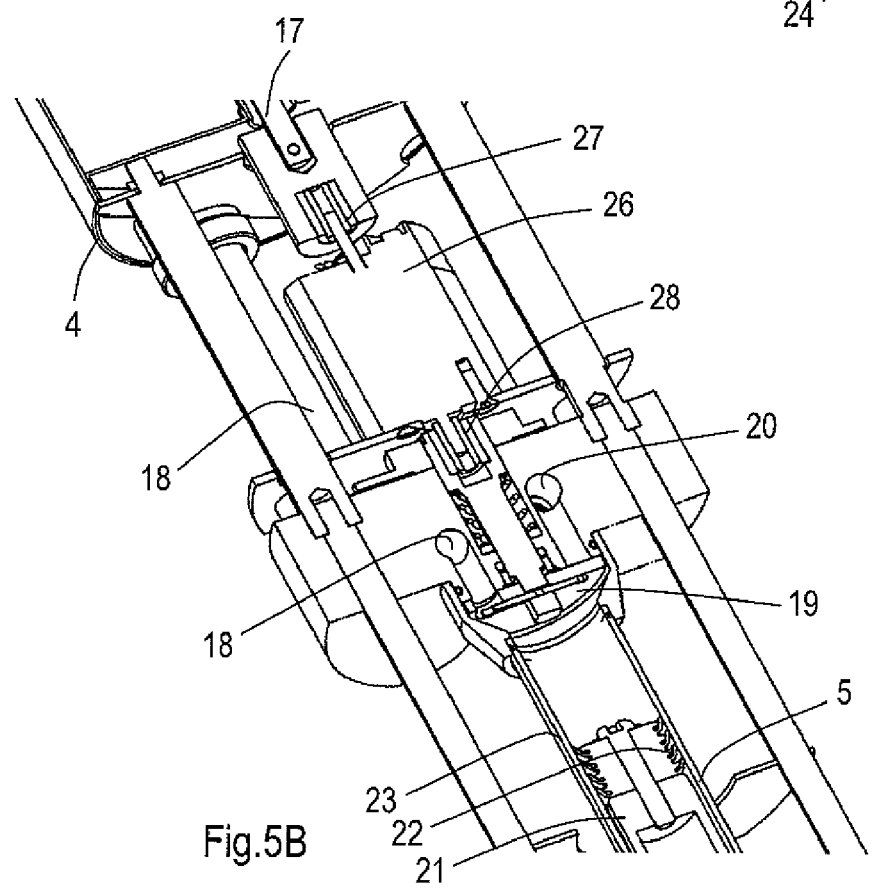

FIGS. 5A and 5B show a module 3 as used in the apparatus 1 of FIG. 1 and comprising a container 4 in turn comprising a stirrer 17, rotatably mounted inside the container 4 and coinciding with its centre line, and a piston pump 5 connected with its suction line 18 to the container 4 and in turn comprising a disc-valve 19 for selectively connecting the pump 5 to the container 4 or to a pressure line 20.

The pump 5 comprises a piston rod 21 provided on one end with a piston 22, disposed within a cylinder 23. The other end of the piston rod 21 comprises a threaded opening which cooperates with a spindle 24, which in turn is connected to or part of an electric motor 25. By driving the electric motor 25 in a first direction the piston rod 21 and the piston 22 are moved away from the valve 19 to draw in material from the container 4. By driving the electric motor 25 in the opposite direction the piston rod 21 and the piston 22 are moved towards the valve 19 to expel the material to the pressure line 20 and thus to the outlet 12 of the valve assembly 9 in the dispense head 6 of the apparatus 1.

The container 4 and pump 5 of each module 3 comprise a further electric motor 26 coupled to both the stirrer 17 and to the valve 19 by means of one way couplings 27, 28 which decouple in opposite rotational directions. I.e., when the electric motor 26 rotates in a first direction, e.g. clockwise, it drives the stirrer 17 while it is decoupled from the valve 19, which thus remains stationary. In the other, opposite direction, in this example counterclockwise, the electric motor 26 operates the valve 19 and it is decoupled from the stirrer 17.

In this arrangement, both the stirrer and the valve can be operated by means of the same electric motor.

As a matter of course, this disclosure is not restricted to the above-disclosed embodiments and can be varied in numerous ways within the scope of the claims. For instance, the portion of valve member comprising the outlets can be flat or concave.

What is claimed:

1. A valve assembly for dispensing a plurality of flowable materials, comprising:
    a valve member having a plurality of inlets for the plurality of flowable materials and dispense outlets communicating with the inlets, and
    a closure comprising a curved strip tensioned about the dispense outlets and having one or more openings in a pattern that corresponds to a pattern of at least some of the outlets,
    wherein the valve member and the closure are movable relative to each other between a closed position in which the outlets are closed and at least one dispensing position in which one or more openings in the closure are at least partially in registery with the dispense outlets thereby opening the dispense outlets.

2. The valve assembly of claim 1, wherein the closure comprises a plurality of openings arranged to simultaneously open and close a plurality of dispense outlets.

3. The valve assembly of claim 1, wherein the valve member comprises a curved portion and the closure and the curved portion of the valve member are rotatable relative to each other about an axis of rotation.

4. The valve assembly of claim 1, further comprising two or more strips for independently opening and closing two or more dispense outlets or groups of dispense outlets.

5. The valve assembly of claim 1, wherein the valve member or the at least one strip comprises two or more outlets or openings or groups of outlets or openings, respectively, separated in the direction of relative movement.

6. The valve assembly of claim 1, wherein the cross-section of the outlets and/or the openings are shaped to facilitate drop release.

7. The valve assembly of claim 1, wherein the outlets are surrounded by a protruding rim.

8. An apparatus for dispensing flowable materials, comprising a valve assembly according to claim 1, a plurality of containers for the flowable materials and a plurality of pumps, wherein the suctions lines of the pumps are connected to respective containers and the pressure lines are connected to the valve assembly.

9. An apparatus for dispensing flowable materials, comprising a valve assembly a valve member having a plurality of inlets for the plurality of flowable materials and dispense outlets communicating with the inlets, and
    a closure having one or more openings in a pattern that corresponds to the pattern of at least some of the outlets,
    wherein the valve member and the closure are movable relative to each other between a closed position in which the outlets are closed and at least one dispensing position in which one or more openings in the closure are at least partially in register with the dispense outlets thus clearing the latter,
    a plurality of containers for the flowable materials and a plurality of pumps, wherein the suctions lines of the pumps are connected to respective containers and the pressure lines are connected to the valve assembly, and
    wherein at least some of the pumps comprising a valve for selectively connecting the pump to the container or to the pressure line,
    at least some of the containers comprising a stirrer, and wherein at least some of the sets of a container and pump comprise an electric motor coupled to both the stirrer and to the valve.

10. The apparatus of claim 9, wherein the electric motor is coupled to the valve by means of a one way coupling, which decouples the valve from the motor in a first direction.

11. The apparatus of claim 10, wherein the electric motor is coupled to the stirrer by means of a one way coupling, which decouples the stirrer from the motor in a second direction, opposite to the first direction.

12. A module for use in an apparatus according to claim 9, further comprising
    a container in turn comprising a stirrer,
    a pump connected with its suction line to the container and in turn comprising a valve for selectively connecting the pump to the container or to a pressure line or dispense opening, and
    an electric motor coupled to both the stirrer and to the valve.

13. The module of claim 12, wherein the electric motor is coupled to the valve by means of a one way coupling, which decouples the valve from the motor in a first direction.

* * * * *